Dec. 17, 1963         L. A. MEDLAR                3,114,879
                FLUID DAMPED ELECTRICAL METER
Filed July 26, 1960                         2 Sheets-Sheet 1
FIG. 1
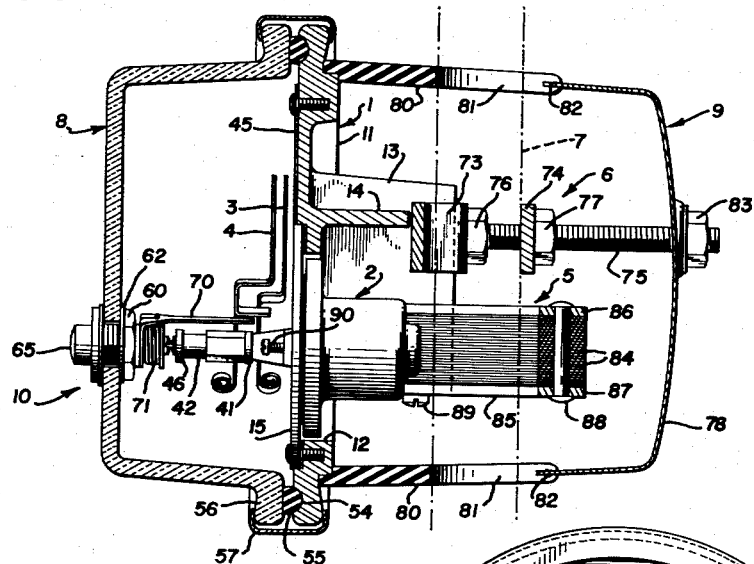
FIG. 3
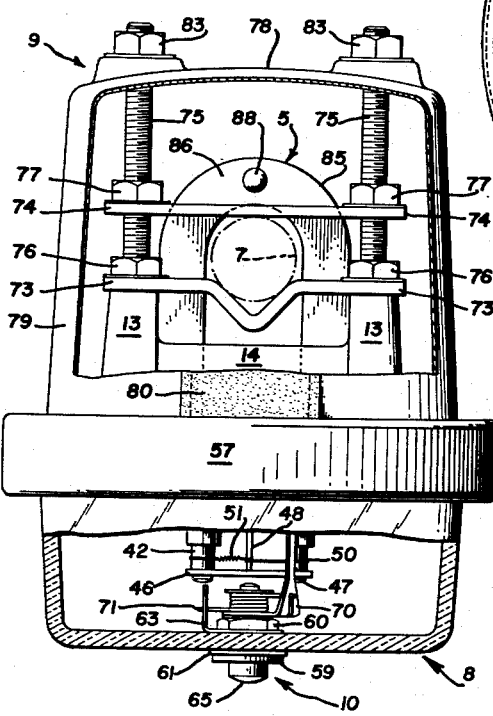
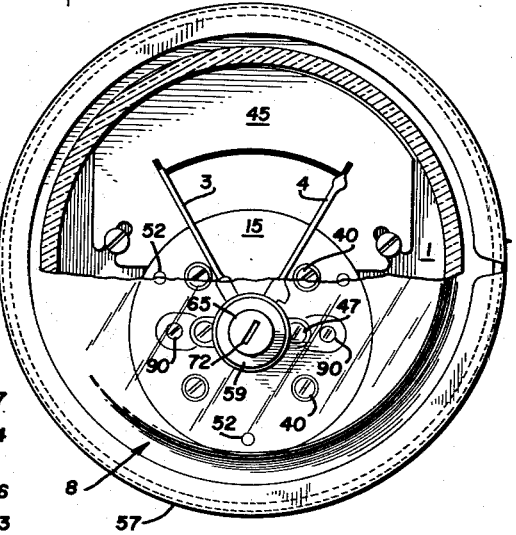
FIG. 2
INVENTOR.
LEWIS A. MEDLAR
BY  D C Roylance
                ATTORNEY Dec. 17, 1963 L. A. MEDLAR 3,114,879
FLUID DAMPED ELECTRICAL METER
Filed July 26, 1960 2 Sheets-Sheet 2
FIG. 4
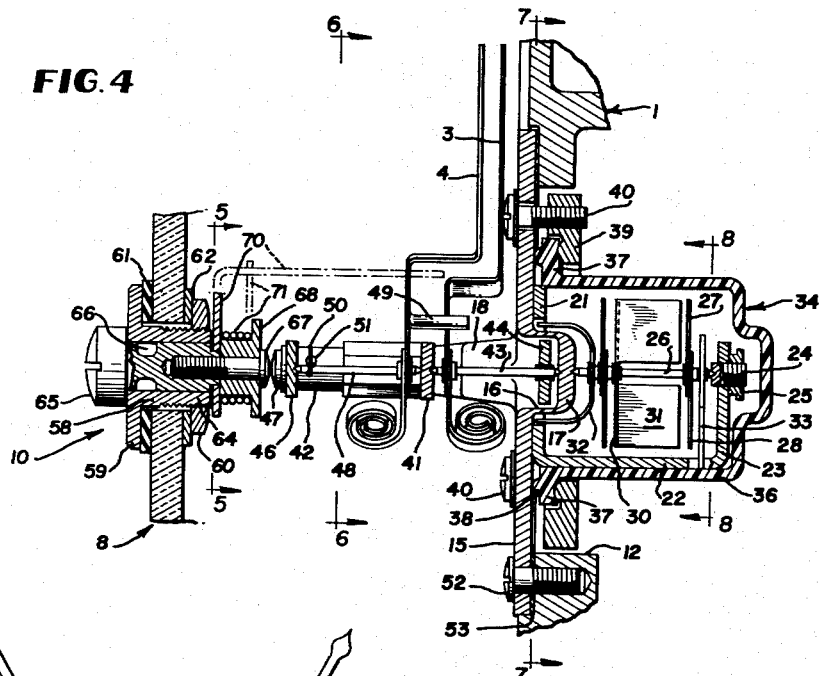
FIG. 6
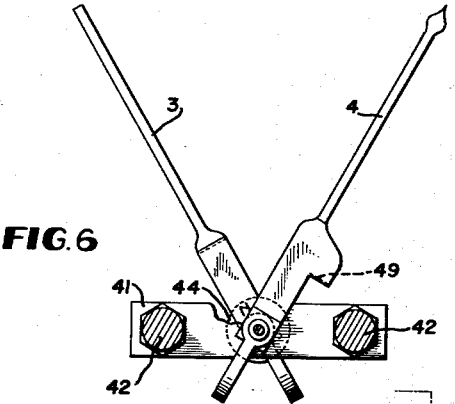
FIG. 5
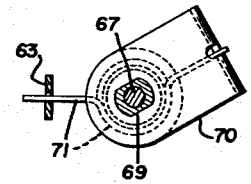
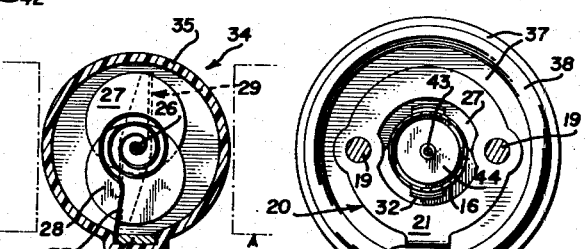
FIG. 8   FIG. 7
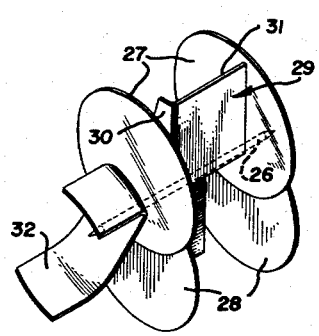
FIG. 9
INVENTOR.
LEWIS A. MEDLAR
BY
ATTORNEY

United States Patent Office 3,114,879
Patented Dec. 17, 1963

3,114,879
FLUID DAMPED ELECTRICAL METER
Lewis A. Medlar, Oreland, Pa., assignor to Lewis A. Medlar and Elmer Edkins, Asbury Park, N.J., and B. Franklin Lewis, Flourtown, Pa., trading as Lewis Electrical Equipment Co., Philadelphia, Pa., a copartnership
Filed July 26, 1960, Ser. No. 45,459
18 Claims. (Cl. 324—125)

This invention relates to electrical meters and particularly to meters in which a slow response to variations in the electrical quantity being detected is achieved by fluid damping.

Various uses for electrical meters require that the response of the meter be slowed sufficiently to avoid indication of transient variations in the electrical quantity to which the meter is to respond. One such application is the use of an A.C. ammeter as a loader indicator or demand meter to show the maximum load or ampere demand which has occurred at a given point in an electrical power distribution system. Power companies employ distribution transformers of various sizes, attempting to match the transformer to the demand in the particular area involved. Since the demand varies from time to time, it is of course desirable to observe the variations as closely as possible and to shift the transformers from location to location, or to install new transformers when necessary, in order that the size of the transformer in a given location shall always be matched as nearly as possible to the existing demand at that location. While instruments for observing variations in demand have been proposed by workers in the prior art, no such device has ever been widely adopted by the trade and a continuing need for a practical and economical device of this type has existed for many years.

An object of the present invention is to devise a highly effective slow response eletcrical meter which is sufficiently economical to make its use as a demand meter, for example, practical on a commercial basis.

Another object is to provide an improved electrical load indicator or demand meter.

A further object is to provide, in a slow response electrical meter, a highly simplified liquid-damped meter movement.

Yet another object is to devise a slow response electrical meter in which the meter movement is completely immersed in a damping liquid, yet the meter construction is inexpensive and easily assembled.

A still further object is to provide such a meter construction wherein the meter movement is wholly confined within a liquid-filled, sealed chamber and the indicating means is driven magnetically through a wall of the chamber.

In order that the manner in which these and other objects are attained, in accordance with the invention, can be understood in detail, reference is had to the accompanying drawings, which form a part of this specification, and wherein:

FIG. 1 is an axial sectional view, with some parts shown in side elevation, of a demand meter constructed in accordance with one embodiment of the invention;

FIG. 2 is a front elevational view of the meter of FIG. 1 with part of the casing broken away for clarity of illustration;

FIG. 3 is a side elevational view of the meter of FIG. 1, with portions of the casing broken away for clarity;

FIG. 4 is a fragmentary axial sectional view similar to FIG. 1 but on a larger scale;

FIGS. 5–8 are transverse sectional views taken respectively on lines 5—5, 6—6, 7—7 and 8—8, FIG. 4, and FIG. 9 is a perspective view of the movement of the meter illustrated in FIGS. 1–4.

Turning now to the drawings in detail, it will be seen that the embodiment of the invention chosen for illustration is a maximum load indicator or demand meter comprising a frame plate 1, a liquid-damped enclosed movement assembly 2 arranged to actuate a present reading indicator 3 and a maximum reading indicator 4, magnetic field producing means 5, a clamp 6 for attaching the device to a conductor 7, a transparent front casing 8, a back casing 9 and manual reset means indicated generally at 10.

Frame plate 1 is an integral non-magnetic member having a circular main body 11 provided with a circular opening 12 offset downwardly from the center of the plate as viewed in FIGS. 1 and 2. A pair of parallel, spaced projections 13 are provided, extending rearwardly from the main body of the frame plate, each on a different side of opening 12. A strengthening rib 14 extends horizontally between the projections 13 above opening 12, as seen in FIG. 1. Advantageously, frame plate 1 is formed by die casting from a suitable aluminum alloy.

The meter movement assembly 2 comprises a circular mounting plate 15 provided with an integrally formed, centered, cup-shaped portion comprising a thin, cylindrical side wall 16 and a relatively thick end wall 17, the latter being provided at each face with a centered pivot bearing depression. A pair of mounting bosses 18 project forwardly from the front face of mounting plate 15, each on a different side of the centered cup-shaped portion. Rigidly secured to the rear face of plate 15, as by screws 19, FIG. 7, is a bracket 20 including a front ring 21, a bottom arm 22 extending at right angles to the plane of ring 21, and an upright bearing support 23. A pivot bearing element 24 is threaded in a matching opening in support 23 and locked in place by a nut 25. The rear face of wall 17 is provided with a bearing recess, and an arbor 26 is rotatably supported by that recess and bearing element 24, the arbor extending at right angles to ring 21 coaxially with respect to wall 16.

As best seen in FIG. 9 arbor 26 carries two circular magnetic vanes 27 and two circular non-magnetic balancing vanes 28, each magnetic vane 27 being paired with one of the balancing vanes. Vanes 27, 28 are all of identical circular plan shape and of the same thickness, magnetic vanes 27 being of nickel-iron alloy and vanes 28 of brass of the same density as the magnetic alloy. Each vane 27, 28 is provided with a mounting hole offset radially from the center of the disc, the mounting holes and the radial offset being the same in each disc. As seen in FIG. 9, the vanes are so arranged that the main body portion of each magnetic vane 27 projects from arbor 26 in a direction opposite to that in which the main body portion of the corresponding non-magnetic vane projects. Hence, though each magnetic vane 27 is eccentric with respect to the axis of arbor 26, it is rotationally balanced on the arbor by the non-magnetic vane 28 with which it is paired. The two vanes 27 are disposed in identical angular positions on the arbor. The two pairs of vanes 27, 28 are spaced apart axially along arbor 26, one pair being adjacent wall 17 and the other adjacent bearing support 23. The vanes 27, 28 are secured to arbor 26 by staked bushings in a manner well known in the meter art.

Fixed to arbor 26 between the axially spaced pairs of vanes 27, 28 is a damping rotor 29. Formed of sheet aluminum, rotor 29 has a flat main body 30 which is symmetrical with respect to the arbor. Identical vanes 31 project from each half of body 30, being opposed across the arbor and facing generally in the direction of rotation of the arbor. Body 30 is disposed adjacent one of the pairs of vanes 27, 28 and vanes 31 project, axially of the assembly, for most of the distance between the two pairs of vanes 27, 28. It will be noted that rotor 29 is completely symmetrical with respect to its axis of rotation and is therefore completely balanced rotationally.

Adjacent wall 17, there is fixed to arbor 26 a magnetic member 32, the end portions of which are parallel, extend axially of the assembly and are closely adjacent to the outer surface of cylindrical wall 16. At the other end of the assembly, a spiral spring 33 has its inner end fixed to arbor 26 and its outer end portion extended and engaged in a lateral notch in bottom arm 22 of bracket 20.

The movement is contained by a cup-shaped housing 34 of non-magnetic material. Advantageously, housing 34 is molded as an integral piece from polyethylene and includes a generally cylindrical main wall 35 having an axially extending outwardly offset portion 36 defining a groove which receives arm 22 of bracket 20, a side wall of the groove serving to hold the end of spring 33 engaged with arm 22, as will be clear from FIG. 8. At the mouth of housing 34, the inner surface of wall 35 has the configuration of the periphery of ring 21 of bracket 20 (see FIG. 7), the ring being embraced by the wall. Here, wall 35 is flanged outwardly, annular flange 37 having a sealing bead 38 engaging the rear face of mounting plate 15. The flange 37 is clamped tightly against plate 15, closing and completely sealing the housing, by a clamping ring 39 and a plurality of screws 40. The interior of housing 34 is filled with a suitable viscous damping material, advantageously a silicone oil.

A pivot bearing plate 41 extends across the front faces of bosses 18 and is secured thereto by the threaded ends of a pair of parallel, forwardly projecting studs 42. The center of plate 41 is aligned with arbor 26 and is provided with two pivot bearing depressions, one on each face. Wall 17 is provided on its front face with a centered bearing depression. A second arbor 43 is rotatable with one end engaged in the bearing depression on the front face of wall 17 and the other in the bearing depression on the rear face of plate 41, arbors 26 and 43 being axially aligned. Within the confines of wall 16, so as to be positioned between the ends of magnetic member 32, a diametrically magnetized permanent magnet disc 44 is fixed to arbor 43, the circular periphery of the disc being closely adjacent to the inner surface of wall 16. Adjacent plate 41, the present reading pointer 3 is fixed to arbor 43, the pointer projecting radially from the arbor across a dial 45, FIG. 1, secured to the front face of frame plate 1, when plate 15 is attached to the frame plate.

A second pivot bearing plate 46 is secured to the forward ends of studs 42, as by screws 47, and is provided on its rear face with a centered bearing depression. A third arbor 48 is rotatably supported by having one end engaged in the bearing depression in plate 46 and the other in the front bearing depression in plate 41. Maximum reading pointer 4 is fixed to arbor 48 adjacent plate 41. As will be clear from FIGS. 1, 4 and 6, pointer 4 includes a finger 49 projecting axially into the path of travel of pointer 3 on the up-scale side thereof. Hence, an up-scale movement of pointer 3 results in a like up-scale movement of pointer 4. Arbor 48 is frictionally restrained by a tensioned friction cord 50 extending helically about the arbor for at least one turn, the ends of cord 50 being attached to studs 42 and a coil spring 51 being interposed in the cord to tension the same. The frictional effect of cord 50 on arbor 48 is sufficiently small to allow pointer 4 to be moved up-scale when arbor 43 is turned by the meter movement, but is adequate to retain pointer 4 in that position to which it has been moved by pointer 3 until the meter is reset manually by actuation of reset means 10 as hereinafter described.

Mounting plate 15 is secured to the front face of frame plate 1, as by screws 52, FIG. 4, a thin polyethylene or like cushioning gasket 53 being interposed between the two plates. Housing 34 projects through opening 12, the clamping plate 39 and flange 37 being disposed within the opening. As best seen in FIG. 1, housing 34 is disposed between projections 13.

Adjacent its periphery, the front face of frame plate 1 is provided with a forwardly opening circular groove 54 in which is disposed a ring gasket 55, FIG. 1. The transparent front cover 8 is generally cup-shaped and has an outwardly projecting annular flange 56 held in sealing engagement with gasket 55 by a clamping ring 57.

Referring to FIG. 4, it will be seen that reset means 10 comprises a hollow sleeve 58 projecting through an opening in cover member 8, the sleeve being provided at its outer end with a head 59 and being threaded exteriorly at its outer end for cooperation with a nut 60. Sealing gasket 61 is disposed between head 59 and the outer face of cover member 8. A washer 62 is located between nut 60 and cover member 8 and includes a laterally disposed, rearwardly projecting extension constituting a detent finger 63, FIG. 5. Sleeve 58 and washer 62 are thus rigidly mounted on front cover member 8 by the clamping action between head 59 and nut 60.

Rotatably disposed in the bore of sleeve 58 is an actuating shaft 64 including a forwardly exposed knob 65, an annular groove 66 to receive a suitable material for effecting a seal between the shaft and sleeve, and a threaded, rearwardly opening bore in which is engaged a screw 67. Screw 67 mounts a hub 68. The rear end portion of shaft 64 includes a flat-sided tip 69, FIG. 5, upon which is engaged a reset finger 70, finger 70 having an opening of the same shape as tip 69 of the shaft, so that rotation of the shaft results in rotary movement of the finger. As best seen in FIG. 1, the finger 70 is annular in shape, including a portion extending axially of the meter into engagement with the up-scale side of maximum reading pointer 4. Finger 70 is biased to a normal, inactive, up-scale position by a torsion spring 71 extending helically about hub 68, the ends of the torsion spring being engaged respectively in an opening in detent 63 and an opening in finger 70. Knob 65 is provided with a screwdriver slot 72, FIG. 2, to allow shaft 64 to be rotated against the biasing force of spring 71 to return pointer 4 to zero position after a reading has been taken.

Clamp means 6, FIGS. 1 and 3, by which the meter is attached to conductor 7, comprises a fixed clamping bar 73 bent into a V at its center to receive conductor 7, a second clamping bar 74, and threaded studs 75. Studs 75 are fixed each in a different one of the projections 13 of frame plate 1 and extend rearwardly therefrom in mutually parallel relation. Bar 73 is provided with an opening at each end, through which openings studs 75 project, and the bar 73 is secured against the flat rear faces of projections 13 by nuts 76 threaded on the studs. Bar 74 also has an opening in each end, studs 75 extend through such openings, and the bar is urged against conductor 7, clamping the same in the V-shaped center portion of fixed bar 73, by nuts 77 threaded on the studs. Thus, clamp means 6 is effective for mounting the meter on conductor 7 and it will be clear that, when conductor 7 is an elevated power line, the meter can be so positioned as to be readable from the ground, using binoculars when necessary, and that, when so mounted, the meter can be reset from the ground by use of a suitable extension tool.

Back cover member 9 is generally cup-shaped, including a rear wall 78, a frusto-conical side wall 79 and a circular front edge. Two elongated notches, of such width and depth as to accommodate conductor 7, are provided in side wall 78 at transversely aligned points, both notches opening into the circular front edge of member 9, as will be clear from FIGS. 1 and 3. Each such notch is closed by a grommet 80 having an opening 81, FIG. 1, through which conductor 7 passes, and a peripheral groove 82, in which the edge portions of the corresponding notch in member 9 are engaged. Grommets 80 are each slit from opening 81 rearwardly to allow entry of conductor 5 into opening 81. The rear wall 78 of cover member 9 is provided with openings through which the studs 75 extend, and member 9 is clamped against frame plate 1 by nuts 83 threaded on the studs.

Magnetic field producing means 5 comprises a stacked series of U-shaped magnetic laminae 84 secured together to form a laminated magnetic structure 85 including top and bottom face plates 86 and 87, respectively, and fasteners 88. The parallel legs of magnetic structure 85 are of such length, and the curved base of such extent, that the unit can embrace conductor 7 and have its ends disposed each on a different side of housing 34. With the parts positioned in this manner, flow of alternating current in conductor 7 will generate magnetic flux in laminated structure 85 and so establish a magnetic field extending between the end portions of the legs of the U-shaped structure. Such magnetic field extends transversely across housing 34 in the area of eccentrically arranged magnetic vanes 27 and is effective to drive the meter movement against the biasing action of spring 33.

The ends of the legs of magnetic structure 85 are each disposed between housing 34 and a different one of projections 13 of frame member 1, between face plate 87 extending adjacent the bottom edges of the projections 13. Each leg of bottom face plate 87 is provided with an ear (not shown) projecting laterally outwardly along the bottom face of a different one of the projections 13 and magnetic structure 85 is mounted by screws 89, FIG. 1, extending through such ears.

A screw 90 extends rearwardly through each boss 18, being threadably engaged in a suitable bore in the boss, and projects from the rear face of plate 15, each screw 90 being disposed in alignment with the end face of a different one of the legs of the U-shaped magnetic structure 85. Thus, screws 90 constitute reference stops determining the relative position of the magnetic structure 85 and the meter movement, it being understood that the ends of the legs of the magnetic structure 85 are brought into engagement with the tips of screws 90 as the magnetic structure is mounted in the manner described above. This arrangement for fixing the relative position of the magnetic structure 85 allows the use of any selected one of several alternative magnetic structures 85, so long as the magnetic structures are all of the same size, without requiring readjustment of the meter when one magnetic structure 85 is substituted for another. For each meter, a number of the magnetic structures 85 can be provided, all identical except for their magnetic characteristics, and the operating range of the meter can thus be changed by selection of a magnetic structure 85 of the desired characteristics.

When the meter is to be installed on conductor 7, the back cover plate 9, the movable parts of clamp means 6 and the laminated magnetic structure 85 are removed. Clamp means 6 is then applied to conductor 7, so supporting the meter in the desired position for viewing from the ground, assuming that conductor 7 is an overhead power line. Magnetic structure 85 is then fixed in place by means of screws 89. Back cover plate 9 is then installed, the slitted grommets 80 opening to allow entry of conductor 7 into opening 81. Knob 65 is then rotated counterclockwise to assure that maximum reading pointer 44 is at zero position.

So assembled and installed, the meter is completely enclosed and substantially sealed, so as to be proof against the adverse effects of weather and dust. When it is necessary to move the meter to a new location, it is obviously possible to detach the same from conductor 7 quickly and easily.

In operation, changes in current flow in conductor 7 cause corresponding changes in the magnetic field extending between the ends of the legs of U-shaped magnetic structure 85. Such changes in the magnetic field tend to result in rotation of arbor 26, it being understood that eccentrically mounted magnetic vanes 27 tend to rotate into alignment with the magnetic field. However, if the change in current flow in conductor 7 is a sudden or transient change, to which the meter is not to respond, little or no movement of arbor 26 will result because of the damping effect of the viscous material in housing 34 on rotor 29. On the other hand, when the change in current flow is of extended duration, such damping effect is gradually overcome, magnetic vanes 27 being rotated eventually into a position of alignment with the magnetic field.

Any rotation of arbor 26 causes a corresponding rotation of magnetic member 32. Such movement of member 32 is transmitted to arbor 43, and thus to present indicating pointer 3, by reason of the coupling provided between member 32 and the diametrically magnetized permanent magnet disc 44. In this connection, it is to be noted that arbor 43 is not connected directly to any spring biasing means but rather is biased to zero position, through the magnetic coupling, by spring 33.

Attention is called to co-pending application Serial Number 45,460, filed concurrently herewith by the present applicant, in which co-pending application the specially balanced, fully immersed and damped meter movement hereinbefore described is claimed.

I claim:

1. In a slow response electrical meter, the combination of a mounting plate, a generally cup-shaped housing, means securing the open mouth of said housing to one face of said mounting plate with an unbroken portion of said plate closing said housing in sealed relation, a meter movement operatively disposed in said housing, said housing being filled with a viscous damping material having a density different than that of air and said movement being immersed in said material, said meter movement being enclosed wholly within the sealed space defined by said housing and said unbroken portion of said plate and mounted for pivotal motion about a fixed axis, indicating means operatively mounted adjacent the other face of said mounting plate and outside of said sealed space, said indicating means being mounted for pivotal movement about an axis at least generally aligned with the axis of motion of said meter movement, motion transfer means coupling said indicating means to said movement said motion transfer means comprising a first magnetic element located within the sealed space defined by said housing and said unbroken portion of said plate, and a second magnetic element located at the side of said plate opposite said housing, said first and second elements coacting magnetically through said plate, and magnetic means located outside of said housing and operatively arranged to drive said movement against the restraining effect of said damping material.

2. In a slow response electrical meter for indicating the maximum load which has occurred at a point in a power distribution system, the combination of a frame member; a closed and sealed housing, means mounting said housing on said frame member; a meter movement including an arbor, said movement being mounted wholly within said housing, said housing being filled with a viscous damping material and said movement being immersed in said damping material; means carried by said frame member for attaching the meter to a current carrying conductor of the power distribution system; indicating means mounted outside of said housing for pivotal movement about an axis at least generally aligned with the axis of said arbor; motion transfer means operatively interconnecting said arbor and said indicating means and including a first magnetic part disposed within said sealed housing and carried by said arbor, and a second magnetic part connected to said indicating means and located outside of said housing, said first and second parts coacting magnetically through a wall of said housing; and means carried by said frame member operative to drive said meter movement, in accordance with current flow in the conductor, against the restraining effect afforded by said damping material.

3. In a slow response electrical meter, the combination of a generally flat frame member having an opening, a mounting plate secured to said frame member and extending across said opening; a cup-shaped housing secured to said mounting plate with the mouth of the housing closed by an unbroken portion of said mounting plate, said housing projecting from one side of said frame member, said housing being sealed and containing a viscous damping material; a meter movement operatively mounted wholly within said housing, said movement being immersed in said damping material and mounted for pivotal motion about a fixed axis; movable indicating means mounted outside of said housing and disposed on the other side of said frame member for pivotal movement about an axis at least generally aligned with the axis of motion of said meter movement; motion transfer means operatively interconnecting said meter movement and said indicating means and comprising a first magnetic element disposed wholly within said housing and connected to said meter movement to turn therewith, and a second magnetic element connected to said indicating means and disposed outside of said housing on said other side of said frame member, said elements coacting magnetically through said mounting plate; and means mounted on said frame member for driving said meter movement against the restraining effect afforded by said damping material.

4. A meter in accordance with claim 3 wherein said housing is an integral non-metallic unit, said meter movement includes a rotatably mounted magnetic vane, and said means for driving said movement comprises a laminated magnetic unit having leg portions parallel to the axis of rotation of said vane, said leg portions being disposed outside of said housing each on a different side thereof.

5. In a slow response electrical meter, the combination of a mounting plate; a cup-shaped housing member having an open mouth; means mounting said housing member on said plate with an unbroken portion of said plate closing the mouth of said housing member in sealed relation with the body of said housing member projecting from one side of said plate, said housing member being filled with a viscous damping material; a meter movement operatively mounted wholly within said housing member for pivotal motion about a fixed axis; movable indicating means mounted wholly outside of said housing member and adjacent the other side of said plate for pivotal movement about an axis at least generally aligned with the axis of pivotal motion of said meter movement and motion transfer means operatively interconnecting said indicating means and meter movement, said motion transfer means comprising a permanent magnet and a magnetic member mounted one on said meter movement and the other on said indicating means and cooperating magnetically through said plate.

6. In a slow response electrical meter, the combination of a mounting plate; a cup-shaped housing member having an open mouth, said housing member being secured to said plate with an unbroken portion of said plate closing said mouth, said housing member being sealed and containing a viscous damping material, the portion of said plate closing said housing member being provided with a pair of pivot bearing depressions each at a different face of said plate, one of which opens to the interior of said housing member; a meter movement including an arbor, said movement being disposed wholly within said housing member and immersed in said damping material, an end of said arbor being engaged in said one bearing depression; indicating means including a second arbor; means mounting said indicating means adjacent the side of said plate opposite said housing member, said second arbor having an end engaged in the other of said bearing depressions, and rotary motion transfer means operatively interconnecting said arbors, said motion transfer means comprising a first rotary magnetic part disposed within said housing and secured to said first arbor and a second rotary magnetic part disposed outside of said housing and secured to said second arbor, said magnetic parts coacting magnetically through said plate.

7. A meter in accordance with claim 6 and wherein said means mounting said indicating means includes a bearing member mounted on said plate and spaced therefrom, said bearing member having a pivot bearing depression aligned with and facing said other bearing depression and in which the other end of said second arbor is engaged.

8. A meter in accordance with claim 7 and wherein said indicating means further comprises a third arbor; a second bearing member mounted on said plate and spaced from said first bearing member on the side thereof opposite said plate, said first and second bearing members being provided with aligned bearing depressions in which the ends of said third arbor are respectively engaged; a present reading pointer carried by said second arbor; a maximum reading pointer carried by said third arbor, said maximum reading pointer including a portion projecting into the path of travel of said present reading pointer; and frictional means restraining said third arbor against free rotational movement.

9. In a slow response electrical meter, the combination of a closed and sealed chamber containing a viscous damping material; a meter movement mounted wholly within said chamber, said movement including an arbor and being immersed in said damping material; a biasing spring disposed within said chamber and connected to said arbor to bias said movement toward an initial position; indicating means mounted wholly outside of said chamber and including a second arbor at least generally aligned with said first mentioned arbor, a pointer carried by said second arbor, and a scale cooperating with said pointer; and a magnetic coupling rotatably interconnecting said arbors through a wall of said chamber, said magnetic coupling comprising a first magnetic part disposed within said sealed chamber and carried by said first mentioned arbor and a second magnetic part disposed outside of said chamber and secured to said second arbor, said spring being the sole biasing member tending to effect down-scale return of said pointer.

10. In a slow response electrical meter, the combination of a closed and sealed chamber containing a viscous damping material; a meter movement mounted wholly within said chamber, said movement including an arbor and being immersed in said damping material; indicating means mounted wholly outside of said chamber and including a second arbor at least generally aligned with said first mentioned arbor, a pointer carried by said second arbor, and a scale cooperating with said pointer; a magnetic coupling rotatably interconnecting said arbors through a wall of said chamber, said coupling comprising a first magnetic part disposed within said chamber and secured to said first mentioned arbor and a second magnetic part disposed outside of said chamber and secured to said second arbor and a biasing spring connected to one of said arbors to bias said pointer in a down-scale direction.

11. In a slow response electrical meter, the combination of a mounting plate; a cup-shaped housing member having a generally cylindrical side wall, an open mouth, and an annular flange at said mouth; means clamping said flange to said plate to mount said housing member on said plate, said plate closing and sealing the mouth of said housing member, the portion of said plate closing the mouth of said housing member including a cup-shaped portion having a cylindrical wall of smaller diameter than the side wall of said housing member and extending coaxially with respect thereto; a meter movement including a first arbor, said movement being operatively mounted within said housing member, said housing member containing a viscous damping material and said movement being immersed in said damping material; indicating means mounted outside of said housing and including a second arbor axially aligned with respect to said first arbor; and a magnetic coupling rotatably interconnecting said arbors, said coupling comprising a permanent magnet secured to one of said arbors and magnetized diametrically with respect thereto, said one arbor extending coaxially within said cup-shaped portion and said magnet being disposed within said cup-shaped portion, said magnetic coupling also comprising a magnetic member secured to the other of said arbors and disposed adjacent to the cylindrical wall of said cup-shaped portion to coact magnetically with said permanent magnet through the cylindrical wall of said cup-shaped portion.

12. In a slow response electrical meter for indicating long term changes in current carried by a conductor, the combination of a plate; a non-metallic cup-shaped housing member having an open mouth; means mounting said housing member on said plate with the latter closing and sealing the mouth of said housing member; a meter movement mounted wholly within said housing member and including an arbor and a vaned damping rotor fixed to said arbor, said housing member being filled with a viscous damping material in which said rotor is immersed; a U-shaped magnetic structure mounted with its legs disposed each on a different side of said housing member, there being space between said housing member and the base of said U-shaped magnetic structure to accommodate such conductor; movable indicating means disposed at the side of said plate opposite said housing member and including a second arbor coaxially aligned with said first mentioned arbor, and a magnetic coupling operatively interconnecting said arbor and said indicating means, said magnetic coupling comprising a permanent magnet fixed to said second arbor and magnetized diametrically with respect thereto, and a magnetic member disposed within said housing member and fixed to said first mentioned arbor.

13. In a slow response electrical meter for indicating the maximum load which has occurred at a point in an alternating current power distribution system, the combination of a support; means defining a closed and sealed housing secured to said support; a meter movement including an arbor, said movement being mounted wholly within said housing, said housing being filled with a viscous damping material and said movement being immersed in said damping material; means carried by said support for attaching the meter to an alternating current carrying conductor of the power distribution system; indicating means mounted outside of said housing and including a present reading indicator and a resettable maximum reading indicator; motion transfer means operatively interconnecting said arbor and said indicating means, said motion transfer means including a first magnetic part carried by said arbor and a second magnetic part connected to said indicating means and located outside of said housing, said first and second parts co-acting through a wall of said housing; and magnetic means carried by said support and operative to produce magnetic flux to drive said movement in accordance with the alternating current flow in the current carrying conductor to which the meter is attached, the magnetic effect of such flux being operative to drive said meter movement, against the restraining effect afforded by said damping material, and so drive said indicating means.

14. In a slow response electrical meter, the combination of means forming a closed and sealed chamber, said chamber being filled with a viscous damping material having a density different than that of air; a meter movement operatively mounted within said chamber and immersed in said damping material, said meter movement being arranged for pivotal motion about a fixed axis; indicating means operatively mounted outside of said chamber for pivotal movement about an axis at least generally aligned with the axis of motion of said meter movement; motion transfer means operatively coupling said indicating means to said meter movement and comprising a first magnetic part disposed within said chamber and a second magnetic part disposed outside of said chamber, said first and second parts coacting magnetically through a wall of said chamber; and magnetic means operatively disposed outside of said chamber to drive said meter movement against the restraining effect of said damping material.

15. An electrical meter in accordance with claim 14 and wherein said movement includes a vaned damping rotor.

16. In a slow response electrical meter, the combination of a mounting plate; a cup-shaped housing member having an open mouth; means mounting said housing member on said plate with an unbroken portion of said plate closing the mouth of said housing member and with the body of said housing member projecting from one side of said plate, said housing member being filled with a viscous damping material, said plate including a cup-shaped portion projecting into said housing member; a meter movement operatively mounted wholly within said housing member for pivotal motion about a fixed axis; movable indicating means mounted adjacent the other side of said plate for pivotal movement about an axis at least generally aligned with the axis of pivotal motion of said meter movement; and a magnetic coupling including a first magnetic element connected to said indicating means and disposed within said cup-shaped portion of said plate and a second magnetic element connected to said meter movement and disposed within said housing member adjacent the side wall of said cup-shaped portion of said plate, said first and second elements coacting magnetically through the side wall of said cup-shaped portion of said plate to operatively interconnect said indicating means and meter movement.

17. In a slow response electrical meter, the combination of a mounting plate; a bracket fixed to said plate and including a bearing portion spaced from one side of said plate; a meter movement including a first arbor mounted for rotation about an axis at right angles to said plate, one end of said arbor engaging said bearing portion, said movement including a damping rotor fixed to said arbor; a cup-shaped housing member having an open mouth; means mounting said housing member on said plate with said plate extending across and closing the mouth of said housing member in sealed relation, said bracket and said meter movement being disposed wholly within said housing member, said housing member being filled with a viscous damping material in which said rotor is immersed; indicating means including a second arbor mounted in axial alignment with said first arbor and located on the other side of said plate; and a magnetic coupling operatively interconnecting said arbors through said plate, said coupling comprising a first magnetic element fixed to one of said arbors and a second magnetic element fixed to the other of said arbors.

18. An electrical meter in accordance with claim 17 wherein the portion of said plate closing the mouth of said housing member is provided with bearing means supporting the other end of said first arbor.

References Cited in the file of this patent
UNITED STATES PATENTS

| | | |
|---|---|---|
| 1,452,591 | Brogger | Apr. 24, 1923 |
| 2,057,845 | Pattee | Oct. 20, 1936 |
| 2,229,774 | Schulze | Jan. 28, 1941 |
| 2,295,959 | Melville | Sept. 15, 1942 |
| 2,355,237 | Pethes | Aug. 8, 1944 |